Sept. 19, 1939. W. H. COLES ET AL 2,173,295
IRRIGATION DEVICE
Filed Aug. 1, 1938
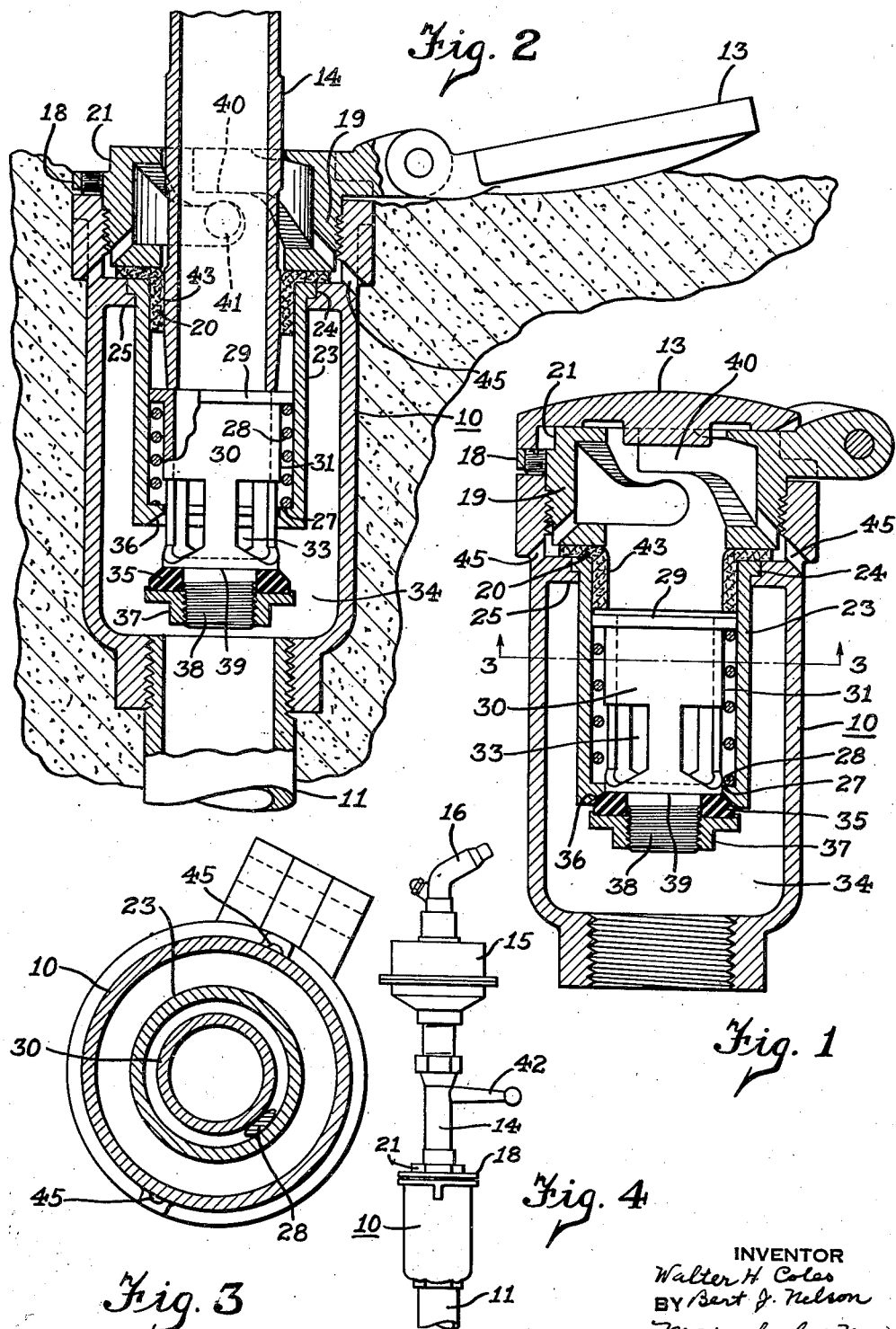
INVENTOR
Walter H. Coles
BY Bert J. Nelson
Marechal & Noe
ATTORNEY Patented Sept. 19, 1939

2,173,295

UNITED STATES PATENT OFFICE 2,173,295

IRRIGATION DEVICE

Walter H. Coles and Bert J. Nelson, Troy, Ohio, assignors to The Skinner Irrigation Company, Troy, Ohio, a corporation of Ohio Application August 1, 1938, Serial No. 222,373

3 Claims. (Cl. 284—19)

This invention relates to water sprinklers or the like, and more particularly to sprinkling or irrigating apparatus adapted for underground systems having provision for readily connecting a portable sprinkler to an underground water supply pipe.

One object of the invention is the provision of a sprinkling apparatus of the character mentioned, embodying a valve body member adapted to be readily and quickly engaged with a sprinkler, the body member being arranged underground with its upper end near the ground level and containing a readily removable valve and valve seat unit that can be taken out as an assemblage from the end of the body member in a very convenient manner for inspection or repair or for any other purpose.

Another object of the invention is the provision of a valve and valve seat construction arranged in a valve body member of the character mentioned, and of such construction that the valve seat member is removably carried at its upper end on the valve body member and forms the sole support for the valve and for suitable spring means which is provided between the valves and the valve seat member to normally hold the valve in closed position.

Other objects and advantages of the invention will be apparent from the following description, the appended claims, and the accompanying drawing, in which:

Fig. 1 is a vertical sectional view through a sprinkling apparatus embodying the present invention;

Fig. 2 is a vertical sectional view of the sprinkling apparatus showing the same underground and connected to an underground water distributing pipe and to a sprinkler supporting water conduit;

Fig. 3 is a horizontal section on the line 3—3 of Fig. 1; and

Fig. 4 is a side elevation of a sprinkling system, shown with the sprinkler attached, and illustrated on a smaller scale than Figs. 1 to 3.

Referring more particularly to the drawing by reference numerals, 10 generally designates a valve containing body member of a water sprinkling system, adapted to be supported underground with its upper end substantially at the ground level. It will be understood that the surrounding ground level can be slightly above or slightly below the upper end of the body member 10, as desired, although the device is preferably mounted as shown in Fig. 2. The body member 10 constitutes a part of an underground water distributing system, the water being supplied through an underground water pipe 11, which is threaded into the lower end of the body member. The body member contains a valve that is adapted to control the flow of water through it so that the pressure of the water can be maintained in the pipe 11. When the device is not in use, the top of the body member 10 may be covered by a cover 13. When in use, however, the cover 13 is opened to the position shown in Fig. 2 and a water conduit 14 is inserted into the body member, the water conduit being so arranged as to open the valve and hold the valve open when in place so that the water can be supplied to a sprinkling head 15 carried by the water conduit 14. The sprinkling head can be of any desired construction, the one shown having a sprinkling nozzle 16 which is adapted to rotate on a vertical axis.

The body member is provided with a top member 18 which extends upwardly from the top of the body member only a comparatively small distance so that it will not project very far above the ground level. As shown, the downwardly extending portion 19 of the top member is threaded into the upper end of the body member 10, a suitable gasket 20 of leather or other suitable material being provided between these two parts. The top member 18 preferably has a hexagonal portion 21 so that it can be readily secured to the body member, by a wrench.

Removably arranged within the body member 10 is a valve seat member 23 having a flange 24 extending outwardly at its upper end and adapted to interfit with the body member, which is provided with a flanged portion 25 cooperating with the gasket 20 and with the flange 24 so that the gasket prevents leakage between the body member and the valve seat member as well as between the body member and the top member 18. When the top member 18 is in position, it will be noted that it holds the valve seat member in position in the body member, although when the top member 18 is removed, the valve seat member 23 is then free to be withdrawn upwardly merely by axial movement through the top of the body member while the latter remains in position underground.

The lower end of the valve seat member 23 is flanged inwardly as shown at 27 to form an abutment cooperating with the lower end of a coil spring 28, the upper end of which engages the outwardly extending flange 29 on the valve member 30. The flange 29 of the valve member is guided in the cylindrical passage provided in the barrel portion of the valve seat member, while the cylindrical portion 31 of the valve is guided by the flange 27, the lower part of the cylindrical portion 31 having openings 33 which permit free communication between the water chamber 34 and the space above the valve, when the valve is depressed to the position shown in Fig. 2. The valve spring 28 normally maintains the valve in its uppermost or closed position as shown in Fig. 1, holding the sealing ring 35 of rubber or fiber against the valve seat 36. The sealing ring 35 of the valve is secured to the cylindrical portion 31 by means of a combined nut and end plate 37 which is threaded on the post 38 that projects integrally from the bottom wall 39 of the valve. Removal of the combined nut and end plate 37 permits the sealing ring 35 to be taken off and the cylindrical portion 31 can then be removed through the upper end of the valve seat member. The valve, spring and valve seat member are adapted to be inserted and removed as a unit assemblage without disturbing the preassembled relationship between those parts. The valve and valve seat member may therefore be properly fitted with one another before they are applied, as a unit, to the body member, and their relative interfit will then be maintained. The removal of the valve, valve seat member and spring can be readily effected, since the valve seat member forms the sole support for the valve, and the valve does not project beyond the circle defined by the outer surface of the barrel portion of the valve seat member.

The top member 18 of the valve housing is provided with a bayonet slot 40, providing passages that extend downwardly and circularly and which are adapted for cooperation with projecting studs 41 that extend oppositely from the water conduit 14. The latter is connected in place merely by inserting the studs 41 in the bayonet openings or slots and then turning the conduit through only a portion of a revolution, this action being facilitated by the extension or handle 42. The bayonet slot passages 40 force the conduit downwardly as it is rotated so that the lower end of the conduit engages and presses downwardly on the upper flanged portion 29 of the valve, opening the valve so that the water can flow from the water chamber 34 up through the conduit 14 and be distributed from the sprinkling nozzle 16.

During the opening movements of the valve, and after the valve is opened, leakage of water along the outside of the conduit 14 is prevented by reason of the downturned portion 43 of the gasket 20, so that the gasket that is used to prevent leakage between the valve seat member and the body member also prevents leakage between the conduit 14 and the valve seat member.

The body member 10 and the top member 18 are preferably provided with small passages 45 permitting drainage of any liquid that might be present above the top of the valve seat member.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A sprinkling apparatus of the character described comprising a body member adapted for attachment to a supply pipe and to be supported underground with its upper end substantially at ground level, a valve seat member removably supported in said body member, a valve carried by the valve seat member and spring means carried by the valve seat member for normally holding the valve against the seat, said valve, seat member and spring means being removable as a unit assemblage through one end of the body member, a top member detachably connected to the body member and securing the valve seat member in position, said valve being adapted to be opened by a water conduit inserted through said top member.

2. A sprinkling apparatus of the character described comprising a body member adapted for attachment to a supply pipe and for positioning underground with its upper end substantially at the ground level, a valve seat member removably supported in said body member, a top member in threaded engagement with the top of said body member for holding the valve seat member in position on the body member, a valve carried by and guided in said valve seat member, spring means engaging said valve and valve seat member for yieldingly holding the valve upwardly against the valve seat, said valve, valve seat member and spring means being axially removable as a unit assemblage from the body member through the top thereof while the latter remains in position underground, and a water conduit detachably connected to said top member and projecting therethrough and having its lower end engaging with the top of the valve to open the same.

3. A sprinkling apparatus of the character described comprising a body member adapted to be supported underground with its upper end substantially at the ground level, a valve seat member including a cylindrical barrel portion having an outwardly extending flange at its upper end and an inwardly extending flange at its lower end, said inwardly extending flange providing a valve seat, means on said body member cooperating with said upper flange to hold the valve seat member in position, a valve guided in the barrel portion of said valve seat member, spring means cooperating with said inwardly extending flange of the valve seat member and with the upper end of the valve for normally holding the valve against the valve seat, said valve seat member, valve and spring means being removable from the body member as a unit assemblage, and a top member detachably connected to the upper end of said body member and securing said valve seat member in position.

WALTER H. COLES.
BERT J. NELSON.